United States Patent [19]

Greig

[11] 4,093,471

[45] June 6, 1978

[54] GLASS FIBER REINFORCED CEMENT COMPOSITE MATERIALS

[75] Inventor: Ian Robert Kennedy Greig, Culcheth, near Warrington, England

[73] Assignee: Pilkington Brothers Limited, St. Helens, England

[21] Appl. No.: 701,787

[22] Filed: Jul. 2, 1976

[30] Foreign Application Priority Data

Jul. 4, 1975 United Kingdom ............... 28359/75

[51] Int. Cl.² ............................................. C04B 31/06
[52] U.S. Cl. ..................................................... 106/99
[58] Field of Search ................ 106/99; 259/146, 148, 259/152, 153, 178 R

[56] References Cited

U.S. PATENT DOCUMENTS 3,758,319   9/1973   Ergene .................................. 106/99

*Primary Examiner*—Winston A. Douglas
*Assistant Examiner*—Mark Bell
*Attorney, Agent, or Firm*—Sughrue, Rothwell, Mion, Zinn and Macpeak

[57] ABSTRACT

Glass fiber reinforced cement composite materials are made by first preparing a cement slurry from a cement/water mix by a high shear mixing process which breaks up cement agglomerates into their primary particles, and then mixing chopped strands of glass fiber into the cement slurry by a low shear mixing process which restricts damage to the glass filaments to a minimum. Both the high shear and low shear processes may be carried out in the same impeller-type mixer using different power inputs and impeller speeds.

6 Claims, 1 Drawing Figure

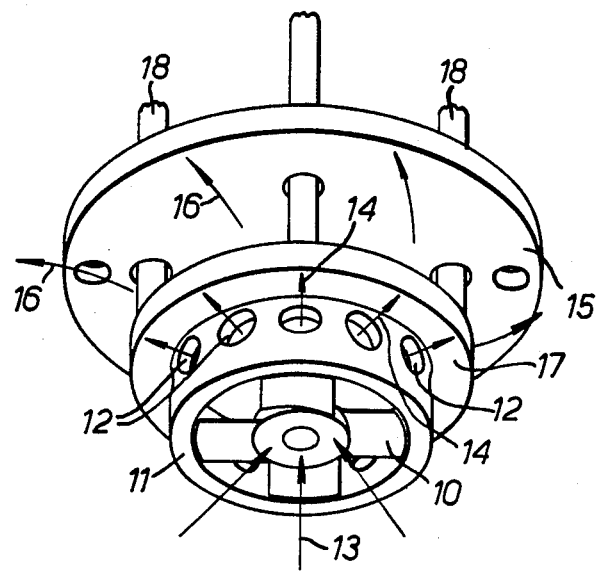

GLASS FIBER REINFORCED CEMENT COMPOSITE MATERIALS

BACKGROUND OF THE INVENTION

1. Field of the Invention

This invention relates to methods of making glass fibre reinforced cement composite materials, and materials made by such methods.

2. Description of the Prior Art

It is known to make glass fibre reinforced cement composite materials by mixing chopped strands of glass filaments (produced by chopping continuous strands or rovings of the glass filaments to lengths of approximately 25 mm) with water, cement, and any other necessary additives using a mechanical mixing apparatus, e.g. of the paddle type, and then to pour the resultant slurry of cement and glass fibres into a mould in which it is allowed to cure. Problems have been encountered in that excessive mixing can cause damage to the glass fibres, particularly by causing "filamentisation", i.e. the separation of the strands into individual filaments. If the mixing is carried out so as to avoid damage to the fibres, the slurry has been found in some cases to be difficult to work, so that difficulty has been encountered in filling complicated moulds. This problem has persisted even though the glass fibre is only added to the cement/water mix after an initial period of mixing of the cement and water.

SUMMARY OF THE INVENTION

According to the present invention, in a method of making a glass fibre reinforced cement composite material in which chopped strands of glass filaments are mixed into a cement slurry which is then poured into a mould and allowed to cure, the cement slurry is first prepared from a cement/water mix by a high shear mixing process in which cement agglomerates are broken up into their primary particles, and the chopped strands of glass filaments are then mixed into the cement slurry by a relatively low shear mixing process which restricts damage to the glass filaments to a minimum.

The use of an initial high shear mixing process in accordance with the invention has been found to result in slurries of cement and glass fibres which have increased flow for a given water/cement ratio, as a result of the breaking up of cement agglomerates into their primary particles. Preferably a deflocculating agent is incorporated in the cement/water mix before it is subjected to the high shear mixing process, in order to assist the breaking up of the cement agglomerates.

The improved flow characteristics of the slurries of cement and glass fibres makes the slurries easier to work, and in particular makes it easier to obtain complete filling of complicated moulds. In cases where the slurry is de-watered before being allowed to cure, it has been found that the rate of de-watering is also improved. Compaction is also improved when the slurry is vibrated. The cured composite materials have been found to show considerable increases in strength as compared with similar materials made using a conventional low shear initial mixing process.

The method of the present invention may be carried out with a cement/water mix which has a water/cement ratio in the range 0.25 to 0.40, preferably in the range 0.32 to 0.35.

Preferably both the high shear mixing process and the low shear mixing process are carried out in the same impeller-type mixer, using different power inputs and consequently different impeller rotation speeds.

The invention also includes a glass fibre reinforced cement composite material made by a method as outlined above.

The term "high shear mixing process" is used in this Specification to indicate a mixing process carried out under conditions in which all the material being mixed is passed through a high shear zone where cement agglomerates are broken up into their primary particles, either with or without the assistance of a deflocculating agent. This can be achieved utilising high speed mixers of the known impeller type. The degree of turbulence produced by such a mixer is related to the Reynolds Number $N_{RE}$, which in turn is defined as $$N_{RE} = Da^2 Np/u$$

where:

$N$ = rotational speed in revs/sec.
$Da$ = impeller diameter in ft.
$p$ = fluid density in lb/cu. ft.
$u$ = viscosity in lb/(ft.) (sec.).

When $N_{RE} > 10,000$ true high shear mixing takes place. When $N_{RE} < 10,000$ but $< 10$ there is a transitional range in which the degree of shear depends upon the distance away from the impeller. Low shear mixing only is effected when the Reynolds Number is 10 or lower.

Another method of defining a high shear mixer is in terms of the mixing power, i.e. the specific power input in terms of KW/100 Kgs. material to be mixed. One can distinguish between 3 distinct kinds of mixers in terms of mixing power available.

(1) Free fall mixers with a specific mixing power of from 0.5 to 1 KW/100 Kgs.
(2) Forced action mixers with 1.0 to 5 KW/100 Kgs.
(3) Intensive mixers with 5.0 to 15.0 KW/100 Kgs. or greater.

As the cement agglomerates are broken up, the consistency of the material being mixed becomes more plastic and while there is an increased tendency to flow, the specific power requirement increases. In order to achieve high shear mixing one must use machines falling in the class of intensive mixers with mixing power in excess of 5.0 KW/100 Kgs. of material to be mixed.

BRIEF DESCRIPTION OF THE DRAWING

The accompanying drawing is a diagrammatic perspective view of one known type of high shear mixer, which can be used in the method of the present invention and which is sold by Joshua Greaves & Sons Limited of Ramsbottom, Lancashire, England.

DETAILED DESCRIPTION OF THE INVENTION

The mixer shown in the drawing comprises a four-bladed rotor 10 mounted on the lower end of a driving shaft (not shown) and having blades profiled somewhat like a fan so as to draw up slurry from below as indicated by arrows 13. The rotor 10 is contained within an outer cage or sleeve 11 of cylindrical form, having a ring of apertures 12 in its wall. A deflector plate 15 is mounted at a distance which can be adjusted above the open top of the cage or sleeve 11.

A part of the slurry drawn up by the rotor is forced through the apertures 12, as shown by arrows 14. The remainder of the slurry drawn up passes through the top of the cage or sleeve 11 and is then deflected sideways by the deflector plate 15, as shown by arrows 16. The mixer is supported from above by a ring 17 to which the sleeve 11 is attached and which carries a bearing (not shown) for the driving shaft, and by rods 18 which are attached to the ring 17 and on which the deflector plate 15 is slidable. High shear mixing takes place as the slurry is drawn by the rotor 10 through the outer cage 11, when the power input to the driving shaft is above 5 KW/100 Kg of slurry, or when the rotor rotates at such a speed as to achieve a Reynolds Number of 10,000 or greater.

Other intensive or high shear mixers are sold by Maschinenfabrik Gustav Eirich of D 6969 Hardheim, Germany, and by Banbury Buildings Limited, of Banbury, Oxfordshire, England (described as the E & M Mixer, developed under the Ban-Cem project).

It is clearly possible by reference to the characteristics of mixers as reported by their manufacturers to identify a mixer which will produce sufficiently high shear conditions to achieve the necessary breaking-up of the cement agglomerates into their primary particles. The choice of mixer may also be dependent on other factors, e.g. ease of filling and transfer of the slurry, and these must also be taken into consideration.

To demonstrate the increased workability of cement-/water slurries made using the high speed mixing process, even in the absence of glass fibre reinforcement, a series of four slurries were made up from a rapid hardening Portland cement sold under the Registered Trade Mark "Ferrocrete" by Associated Portland Cement Manufacturers and water, with a water/cement ratio of 0.4. In two of the slurries, an addition of 2% of CORMIX SP1 (a melamine sulphonate deflocculating agent sold by Joseph Crosfield and Sons Limited, of P.O. Box 26, Warrington WA5 1AB, England) was incorporated before the mixing process. Mixing was carried out with a conventional low shear mixing process, using a standard "Liner Cumflow" pan and paddle type mixer, and with a high shear mixing process using a machine as illustrated in the drawing, the mixing time being 2 minutes in each case. The resultant slurries were tested for workability by the conventional "slump test", which measures the degree of flow of a slurry in conditions of zero shear, by measuring the extent to which a body of the slurry, moulded into a standard frusto-conical shape, slumps after release from the mould. The de-watering rate was also measured by measuring the water/cement ratio after samples had been subjected to vacuum de-watering for 20 minutes. The results obtained are tabulated below:

TABLE I

| | | Slump value | Water/cement ratio after 20 minutes |
|---|---|---|---|
| a) | Mixed by low-shear mixing process | 40 mm | 0.28 |
| b) | Mixed by low-shear mixing process plus 2% CORMIX SP1 | 6 mm | 0.25 |
| c) | High shear mixed | 60 mm | 0.25 |
| d) | High shear mixed | Total | |

TABLE I-continued

| | Slump value | Water/cement ratio after 20 minutes |
|---|---|---|
| plus 2% CORMIX SP1 | Collapse | 0.21 |

Specific examples of the invention will now be described in more detail.

EXAMPLE 1

Slurries were made up consisting of:

| 56% | Ferrocrete | |
| --- | --- | --- |
| 20% | Belgian Sand | |
| 5% | 25 mm chopped strands of glass fibre | |
| 2% | CORMIX SP1 (melamine sulphonate deflocculant | percentages calculated on dry cement weight |
| 0.025% | Carboxymethyl cellulose | |
| Water/cement ratio 0.33 | | |

When mixed conventionally, using low shear mixing, in a "Liner Cumflow" pan and paddle mixer, this slurry had a slump value of nil, the fibres could not be properly incorporated and the resultant mix was not workable.

When mixed by the high shear process, using a machine as illustrated in the drawing, for 2 minutes prior to addition of the chopped strands of glass fibre, and then mixed for a further 1 minute under low shear conditions while the glass fibre strands were being added, the slurry had a slump value of 30 mm. The final mix was easy to work and filled the mould easily. In fact it was possible to lower the water/cement ratio to 0.31 and still achieve useful workability. The final composite had an ultimate flexural strength some 40% higher than a board made from a similar slurry without initial high shear mixing.

EXAMPLE 2

A slurry similar to that of Example 1 but without the carboxymethyl cellulose was workable when mixed for 2 minutes at slow speed by low shear mixing, but with initial high shear mixing for 2 minutes, followed by low shear mixing for 1 minute as the glass fibre strands were added, gave higher strengths:

| | | Limit of proportionality (elastic limit) | Modulus of Rupture (ultimate flexural strength) |
|---|---|---|---|
| a) | slow speed mixed for 2 minutes | 7.7 N/mm$^2$ | 13.9 N/mm$^2$ |
| b) | Initial high shear mixed for 2 minutes, followed by low shear mixing and incorporation of glass fibres for 1 minute | 8.5 N/mm$^2$ | 19.3 N/mm$^2$ |

Thus again an improvement of nearly 40% was obtained in the ultimate flexural strength.

EXAMPLE 3

The same slurry as described in Example 2, when given the initial high shear mixing for 2 minutes, followed by low shear mixing and incorporation of glass fibres for 1 minute and finally vacuum de-watered gave the following values:

| Limit of Proportionality | Modulus of Rupture |
| --- | --- |
| 10.9 N/mm$^2$ | 23.0 N/mm$^2$ |

This is an improvement of 45–50% over what one would expect with conventional low shear mixing.

EXAMPLE 4

A slurry similar to that described in Example 1, except in that the deflocculant was Flocrete N (a sugar-reduced lignosulphonate sold by Cementation chemicals Limited of Mitcham House, 681 Mitcham Road, Croydon CR9 3AP, England), was unworkable when slow speed mixed. With initial high shear mixing for 2 minutes, followed by incorporation of the glass fibre strands and conventional low shear mixing over a period of 1 minute, the slurry flowed well and a composite produced by vibration compaction gave the following strength values:

| Limit of Proportionality | Modulus of Rupture |
| --- | --- |
| 9.4 N/mm$^2$ | 30.1 N/mm$^2$ |

EXAMPLE 5

A cement-water slurry of the following composition:

| | |
| --- | --- |
| 72% | Ferrocrete |
| 0.25% | C 211 (a stabilised sugar-reduced lignosulphonate deflocculant sold by C.B.P. Limited, Cleveland Road, Hemel Hempstead, Hertfordshire, England) |
| 0.25% | Carboxymethyl cellulose |
| 5% | 25 mm chopped strands of glass fibre | and a water/cement ratio of 0.32, was difficult to work when slow speed mixed but when given an initial high shear mixing for 2 minutes, followed by incorporation of the glass fibre strands and conventional low shear mixing over a period of 1 minute, the slurry flowed well and enabled production of a composite, which after vibration compaction and curing had the following strength values:

| Limit of Proportionality | Modulus of Rupture |
| --- | --- |
| 9.3 N/mm$^2$ | 28.5 N/mm$^2$ |

EXAMPLE 6

A slurry of the following composition:

| | |
| --- | --- |
| 39% | Ferrocrete |
| 13% | Sand |
| 13% | PFA (pulverised fly ash sold by Fiddlers Ferry Power Station, Yorkshire, England) |
| 13% | Calmote A.D. (Limestone flour sold by Tarmac-Derbyshire Stone Sales, Dale Road, Matlock DE4 3PL, England) |
| 0.25% | Cormix P2 (a hydroxy carboxylic acid deflocculant sold by Joseph Crosfield and Sons Ltd) |
| 0.025% | Carboxymethyl cellulose |
| 5% | Chopped strands of glass fibre | and a water/cement ratio of 0.46, was unworkable when slow speed mixed. When initially high shear mixed for 2 minutes, followed by incorporation of the glass fibre strands and conventional low shear mixing over a period of 1 minute, the slurry flowed well enough to allow fabrication of a composite which, after compaction and curing, gave the following strength values:

| Limit of Proportionality | Modulus of Rupture |
| --- | --- |
| 8.5 N/mm$^2$ | 27.2 N/mm$^2$ |

The improved strength of glass fibre reinforced composite materials thus obtained by use of the method of the present invention is believed to result partly from the fact that the more fluid slurry resulting from the initial high shear mixing process helps to enable an even distribution of the glass fibres to be achieved in the final slurry and to reduce to a minimum the occurence of plates or clumps of fibres. The improved workability of the slurries and the breaking down of the cement agglomerates into primary particles also aids compaction at later stages of the process, whether effected by vibration, compression or vacuum de-watering.

I claim:

1. In a method of making a glass fibre reinforced cement composite material in which chopped strands of glass filaments are mixed into a cement slurry which is then poured into a mould and allowed to cure, the improvement which consists in first preparing the cement slurry without filaments from a cement/water mix by a high shear mixing process using a mixer to which the power input is at least 5 KW/100 Kg of slurry, so that cement agglomerates are broken up into their primary particles, and then adding the chopped strands of glass filaments into the cement slurry during a relatively low shear mixing process using a mixer to which the power input is 1 KW/100 Kg of slurry or less to avoid separation of the strands into individual, filaments.

2. A method according to claim 1, wherein a deflocculating agent which assists in breaking up cement agglomerates, and which is selected from the group consisting of melamine sulphonates, sugar-reduced lignosulphonates, and hydroxy carboxylic acids, is incorporated in the cement/water mix before it is subjected to the high shear mixing process.

3. A method according to claim 1, wherein the cement/water mix has a water/cement ratio in the range 0.25 to 0.40.

4. A method according to claim 3 wherein the water/cement ratio is in the range 0.32 to 0.35.

5. A method according to claim 1, wherein both the high shear mixing process and the low shear mixing process are carried out in the same impeller-type mixer, using different impeller rotation speeds.

6. A glass fibre reinforced cement composite material made by a method according to claim 1.

* * * * *